Feb. 8, 1966 A. V. ALEXEFF ET AL 3,233,808
COMPENSATOR AND ACCUMULATOR APPARATUS
Filed Nov. 8, 1962 2 Sheets-Sheet 1
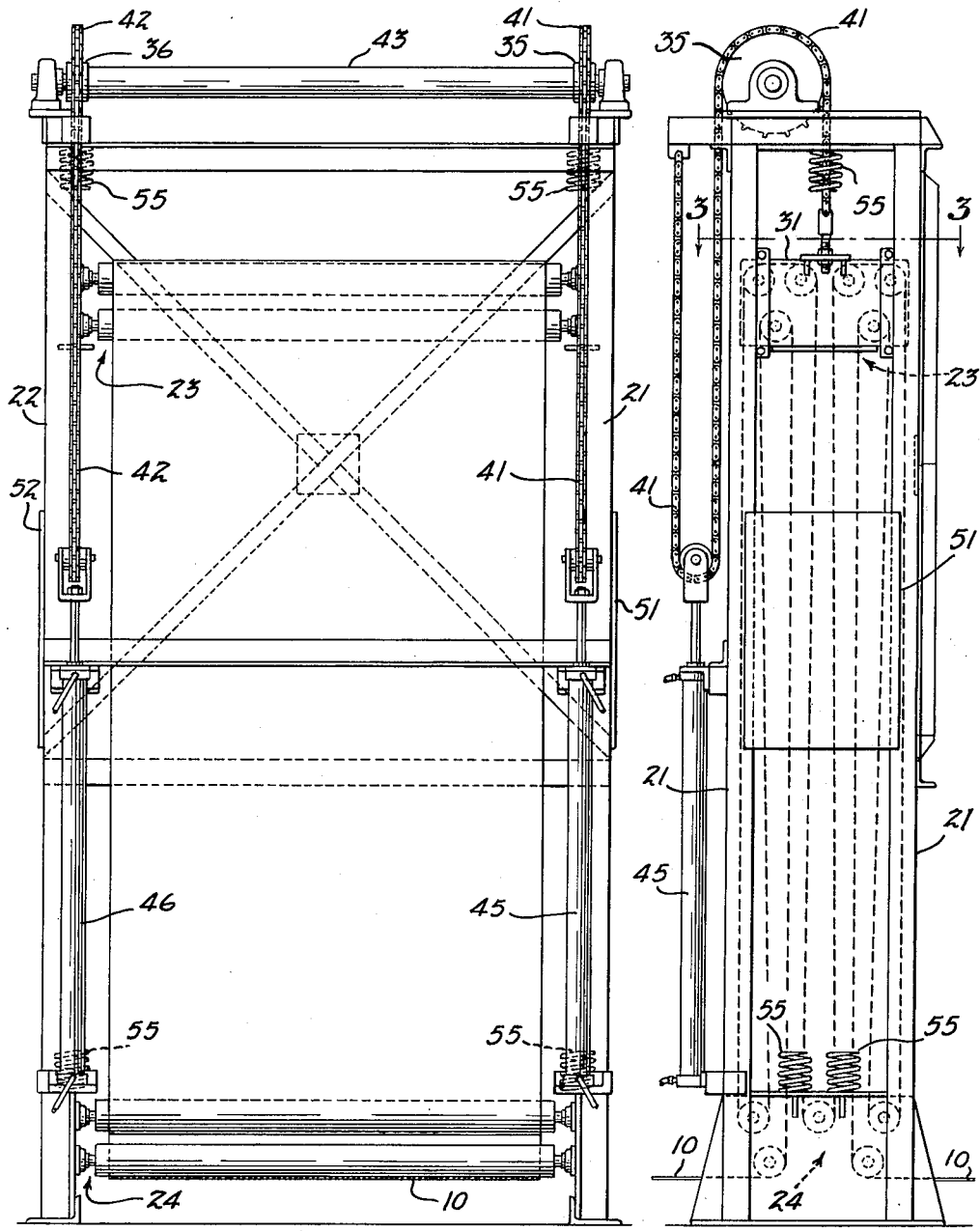
*Fig. 1*
*Fig. 2*
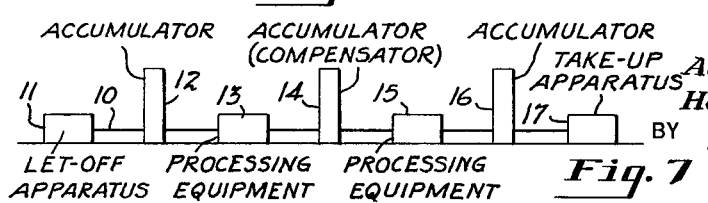
*Fig. 7*
INVENTORS
*Alexander V. Alexeff*
*Howard R. Richards*
BY
ATTORNEYS INVENTORS
*Alexander V. Alexeff*
*Howard R. Richards*
BY
ATTORNEYS

United States Patent Office 3,233,808
Patented Feb. 8, 1966

3,233,808
COMPENSATOR AND ACCUMULATOR
APPARATUS
Alexander V. Alexeff, Cleveland, and Howard R.
Richards, Lakewood, Ohio, assignors to Industrial
Ovens, Incorporated, Cleveland, Ohio, a corporation of Ohio
Filed Nov. 8, 1962, Ser. No. 236,235
4 Claims. (Cl. 226—189)

The present invention relates to strip accumulator means. For purposes of this appliaction "strips" are to be understood to include webs such as metal sheet, paper, textiles, films and wide tapes and to also include strands and to also include wires, cords, narrow tapes, tubings, and monofilaments, such as nylon, rayon, and glass fiber.

In the processing of strip material it is usually necessary to accommodate static or dynamic tension differentials between various sections of the processing line or to accommodate different strip speeds, particularly at the let-off and take-up ends of the equipment.

To this end there are conventionally employed strip accumulator means, capable of storing and letting off lengths of strip material. The accumulator means generally comprise arrays of rollers mounted to be moved away from and toward each other, with the strip festooned along a succession of reaches extending between the arrays. A plurality of rollers are in each array.

In devices known as compensators, material storage may be an incidental feature of accommodation of tension differentials caused by changes in the relative strip speeds between adjacent sections of the line. Frequently compensators employ only a single roller in one of the roller arrays, but in some applications the relative movement required between the arrays becomes excessive so that it is advantageous to save space by festooning the strip back and forth between a plurality of rollers at each array. For purposes of this present application, compensators having a plurality of rollers at each array are regarded as a type of accumulator.

When a tension differential occurs between the infeed and outfeed strip passing through an accumulator, the accumulator is subjected to severe moment imbalances and resulting rocking loads, and correspondingly heavy and costly structure is required to resist these loads. The rocking loads are particularly severe when the infeed of the strip is suddenly braked, or the outfeed is abruptly accelerated.

The present invention contemplates an organization of elements which make it possible to provide accumulator structure which is relatively light and inexpensive even though capable of handling high strip tensions. The invention eliminates costly geared linkages and the like and the heavy structure which such linkages necessitate, as exemplified in U.S. Patent 2,010,122 of 1935.

Previous improvements have considerably simplified accumulator structure. For example, the moving array of rollers in the accumulator has been mounted on a frame suspended from flexible hangers, as seen for example in U.S. Patent 2,280,943 of 1942, the frame being suspended at a central point. Where more than the fewest numbers of rollers are employed, central point suspension of each side of the moving frame has been replaced by a two point suspension as in U.S. Patent 2,494,402 of 1950.

The invention contemplates the elimination of a moving frame, as such. Provided instead is a pair of mounts for the ends of the moving rollers in the accumulator, each of the mounts being suspended from its own flexible hanger means and being substantially unrestrained against vertical movement relative to each other except through the hanger means.

The result is a form of apparatus which is substantially less costly than apparatus of the prior art having comparable performance specifications.

In the drawings:

FIGURE 1 is an elevational view of an accumulator embodying the present invention.

FIGURE 2 is a side elevation of the apparatus shown in FIGURE 1.

FIGURE 7 is a diagrammatic view of a strip processing line with accumulators positioned therein.

Figure 3:
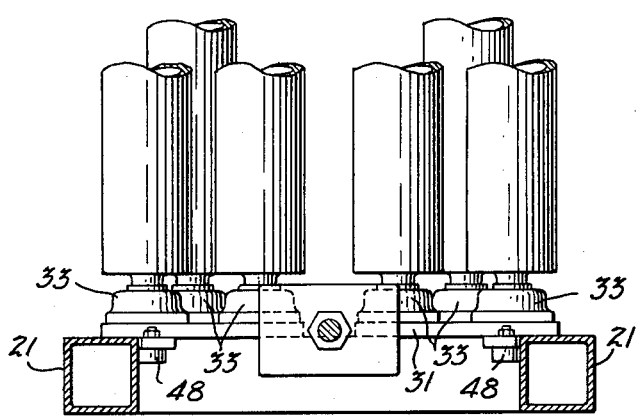
FIGURE 3 is a detail fragmentary view taken from the planes of lines 3—3 in FIGURES 2 and 4.
Figure 4:
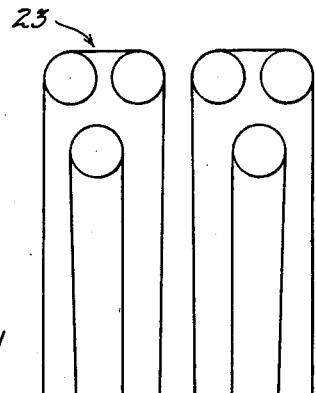
FIGURE 4 is a view on the same scale as FIGURE 3 showing a portion of FIGURE 2 in greater detail.
Figure 4:
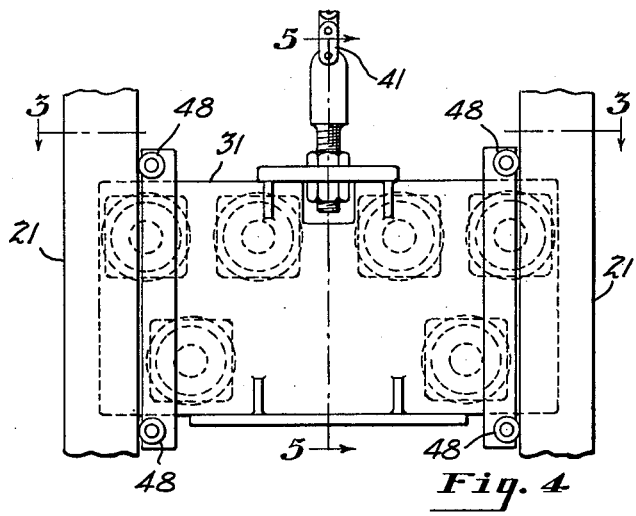

Shown diagrammatically in FIGURE 7 is a strip processing line for processing a strip 10. Let-off equipment 11 may be intermittently stopped to change over from one let-off roller to another, while the outfeed side of the accumulator 12 is called upon to constantly supply the strip 10 to the processing equipment 13. The strip 10 may pass through a compensator 14 to an additional processing section 15 of the processing line, and momentary or extended strip speed differentials may occur between the sections 13 and 15, such differentials being accommodated by the compensator 14. An accumulator 16 is provided between the processing equipment 15 and take-up equipment 17 to accommodate strip speed differentials which may occur as for example upon stopping of the strip 10 at the take-up section 17 in order to change over from one roller to another.

In the following portion of the description, it will be understood that the illustrated accumulator may be substituted for any of the accumulators 12, 14, and 16 shown in FIGURE 7.

The illustrated accumulator apparatus comprises a frame including vertical first side members 21 and second side members 22 (FIGURE 1).

An upper array of rollers 23 and a lower array of rollers 24 are carried on the frame and are provided with linkage means for varying the distance between them. The linkage means in the illustrated apparatus comprises a first bearing mount 31 (FIGURES 2–5) at the first side 21 of the frame and a second bearing mount at the second side 22 of the frame and located immediately behind and opposite the bearing mount 31 as viewed in FIGURE 2.

The mount 31 and the corresponding opposite mount each supports a plurality of end bearings 33 for the rollers on the upper array.

The mount 31 and the corresponding mount at the other side of the frame are each suspended from its own flexible hanger means comprising, respectively, in the illustrated apparatus the chain hangers 41 and 42. The chain hangers 41 and 42 in the illustrated apparatus are tied together for rotation through their upper sprockets which are joined by a torque bar 43. Preferably each flexible hanger 41 and 42 has its own actuating cylinder 45 or 46, respectively, so that the torque deflection of the torque bar 43 represents only small and incidental differentials between the forces exerted by the cylinders 45 and 46. There is no substantial torque bar deflection such as would be involved were one of the members 41 or 42 actuated solely through the torque bar 43. Alternatively, a single actuating linkage and sprocket could be centrally located along the torque bar, so that the deflection of the two halves of the torque bar would be approximately equal even though each of the sprockets 35 and 36 would be totally dependent on the torque bar for driving forces. In any event, the sprockets 35 and 36 and the actuating cylinders 45 and 46 will be seen to comprise take-up and let-off means for the flexible hanger members 41 and 42 for raising and lowering together the mount 31 located at the side 21 of the framework and the opposite mount located at the side 22 of the framework.

The mount 31 and the corresponding mount at the other side of the frame are each provided with reacting cam means such as the guide wheels 48 (FIGURES 3 and 4) which ride against the vertical side frame members 21 and 22. The mounts are thereby constrained against a tendency to tilt forwardly or rearwardly in reaction against differences between infeed and outfeed tension, but remain free to move vertically. The vertically side frame members 21 and 22 are braced by the stiffening plates 51 and 52 to provide firm support against lateral forces imposed by the wheels 48.

The rollers in the upper array 23 extend between the mount 31 and its companion mount at the opposite side of the framework, being supported in the bearings 33 carried on the mounts. The rollers in the lower array 24 extend between fixed members, being carried by bearings similar to the bearings 33 supported on the fixed members.

Figure 6:
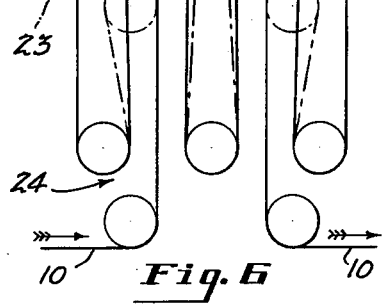
FIGURE 6 is a schematic view illustrating the festooning of a web on the rollers of the illustrated accumulator apparatus at raised and lowered positions thereof.
Figure 5:
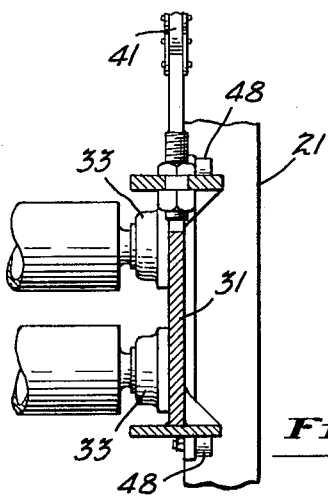
FIGURE 5 is a fragmentary detail view taken from the plane of line 5—5 in FIGURE 4.

As seen in the drawings, and particularly in FIGURES 2 and 6, each of the upper and lower arrays of rollers may advantageously be arranged to be more compact in the fore and aft directions than single-layered arrays of the same numbers of rollers. This compaction minimizes the lateral moment arms loading on the upper roller array at high tensions and particularly minimizes the extremely high instantaneous loads which may occur upon impact of the moving mounts against upper or lower stop members at high tensions. Springs 55 (FIGURE 2) at the top and bottom of the framework minimize the impact forces.

An advantageous form of array having a fairly high degree of fore and aft compaction without requiring a great deal of vertical clearance comprises an array in which the upper and lower arrays of rollers each comprise a pair of sub-arrays vertically spaced from each other in the manner specifically shown in the drawings.

It is to be noted that in the illustrated apparatus, the flexible hangers 41 and 42 each comprise a single flexible member attached to one of the vertically moving mounts centrally between the forward and rear sides of the mount. The hanger members 41 and 42 need therefore merely be tied with each other for vertical movement without elaborate and expensive linkages for correlating the vertical movement of two or more flexible hangers or supports at each side of the frame.

By these means the invention provides a form of apparatus which is substantially less costly than apparatus of the prior art having comparable performance specifications.

The invention is not restricted to the slavish imitation of each and every one of the details described above which have been set forth merely by way of example with the intent of most clearly setting forth the teaching of the invention. Obviously, devices may be provided which change, eliminate, or add certain specific structural details without departing from the invention.

What is claimed is:

1. In accumulator apparatus comprising a frame, first and second arrays of rollers, linkage means for varying the distance between the arrays, the linkage means including a pair of bearing mounts at each side of the frame, each of the mounts supporting a plurality of end bearings for the rollers in one of the arrays, each of the mounts being suspended from its own flexible hanger means, take-up and let-off means for the flexible hanger means for raising and lowering together the pair of mounts, reacting cam means between each of the mounts and the frame for constraining each mount against forward and rearward tilting while allowing vertical movement thereof, the mounts being substantially restrained against vertical movement relative to each other only through the hanger means, the rollers in said one array extending between the pair of mounts and constituting the only connection extending directly between said bearing mounts, said bearing mounts being free of other rigid connections therebetween.

2. A device as defined in claim 1 in which the first and second arrays of rollers each comprise a pair of sub-arrays vertically spaced from each other.

3. A device as defined in claim 1 in which the first and second arrays of rollers each comprise a group of rollers rather than a single layer of rollers whereby the roller arrays are compact in the fore and aft direction as compared to single-layered arrays of the same numbers of rollers.

4. A device as defined in claim 1 in which the lowermost portion of the flexible hanger means for each mount comprises a single flexible member attached to the associated mount centrally between the forward and rearward sides thereof.

References Cited by the Examiner

UNITED STATES PATENTS

| | | | |
|---|---|---|---|
| 1,637,892 | 8/1927 | Benner et al. | 226—119 X |
| 2,062,008 | 11/1936 | Lewis et al. | 226—119 |
| 2,242,751 | 5/1941 | McFarland | 226—189 |
| 2,345,181 | 3/1944 | Cooper et al. | 226—119 X |
| 2,494,402 | 1/1950 | Mursch | 226—10 |
| 2,631,847 | 3/1953 | Hornberger | 226—189 |
| 2,771,984 | 11/1956 | Ranney | 226—119 X |
| 2,785,891 | 3/1957 | Herr | 242—55.01 |

FOREIGN PATENTS 520,619  1/1956  Canada.

MERVIN STEIN, *Primary Examiner.*